US012746610B2

(12) United States Patent
Weger et al.

(10) Patent No.: US 12,746,610 B2
(45) Date of Patent: Sep. 29, 2026

(54) FLUID-TIGHT SEPARATING CLOSURE

(71) Applicant: Sartorius Stedim North America Inc., Bohemia, NY (US)

(72) Inventors: Dietmar Weger, Terenten (IT); Lars Bottcher, Bohemia, NY (US); Jan Neuhaus, Dransfeld (DE); Michael Zumbrum, New Oxford, PA (US)

(73) Assignee: Sartorius Stedim North America Inc., Bohemia, NY (US)

( * ) Notice: Subject to any disclaimer, the term of this patent is extended or adjusted under 35 U.S.C. 154(b) by 1083 days.

(21) Appl. No.: 17/627,333

(22) PCT Filed: Jul. 16, 2020

(86) PCT No.: PCT/US2020/042272
§ 371 (c)(1),
(2) Date: Jan. 14, 2022

(87) PCT Pub. No.: WO2021/011741
PCT Pub. Date: Jan. 21, 2021

(65) Prior Publication Data

US 2022/0266360 A1 Aug. 25, 2022

(30) Foreign Application Priority Data

Jul. 17, 2019 (EP) .................................... 19186842

(51) Int. Cl.
*B23D 21/00* (2006.01)
*B23D 15/04* (2006.01)
(Continued)

(52) U.S. Cl.
CPC ........... *B23D 21/006* (2013.01); *B23D 15/04* (2013.01); *B26D 3/16* (2013.01);
(Continued)

(58) Field of Classification Search
CPC ...... B23D 15/04; B23D 21/006; B23D 21/10; B26D 3/16; B26D 3/169;
(Continued)

(56) References Cited

U.S. PATENT DOCUMENTS 2,776,473 A 1/1957 Dailey et al.
3,276,447 A 10/1966 Hamilton
(Continued)

FOREIGN PATENT DOCUMENTS

AU 2016365524 A1 4/2018
BR 112018004091 A2 10/2018
(Continued)

OTHER PUBLICATIONS

Machine Translation of KR 10-2013-0131880-A, which KR '880 was published Dec. 2013.*
(Continued)

*Primary Examiner* — Matthew P Travers
(74) *Attorney, Agent, or Firm* — Womble Bond Dickinson (US) LLP

(57) ABSTRACT

Method for the forming of a fluid-tight separating closure of a conduit (1) involving the following steps:
providing of a conduit (1) with a sleeve (2),
positioning of the conduit (1) with the sleeve (2) between a die (3) and a stamp (4),
compressing of the sleeve (2) by a relative movement between the die (3) and the stamp (4) in order to form a closure (5);
severing of the closure (5) in a compressed region (6) by a severing tool (7) such that a contact line (8) between the severing tool (7) and the sleeve (2) during severing is shorter than an obtained severing edge (9) of the sleeve (2).

6 Claims, 9 Drawing Sheets

(51) Int. Cl.

| | |
|---|---|
| ***B26D 1/00*** | (2006.01) |
| ***B26D 3/16*** | (2006.01) |
| ***B29C 57/10*** | (2006.01) |
| ***B29C 65/00*** | (2006.01) |

(52) U.S. Cl.

CPC ........ *B26D 2001/006* (2013.01); *B29C 57/10* (2013.01); *B29C 66/4312* (2013.01)

(58) Field of Classification Search

CPC ..... B26D 2001/0053; B26D 2001/006; A61M 39/146; A61M 39/28; A61M 2039/282; Y10T 83/0429; Y10T 83/343; B29C 57/10; B29C 66/4312

See application file for complete search history.

(56) References Cited

U.S. PATENT DOCUMENTS

| | | | |
|---|---|---|---|
| 4,335,756 | A | 6/1982 | Sharp et al. |
| 5,007,666 | A | 4/1991 | Kyfes |
| 5,020,572 | A | 6/1991 | Hunt |
| 5,520,218 | A | 5/1996 | Hlavinka et al. |
| 5,935,366 | A | 8/1999 | Wood |
| 5,968,054 | A | 10/1999 | Yeatts et al. |
| 6,779,575 | B1 | 8/2004 | Arthun |
| 7,351,010 | B1 * | 4/2008 | Kelly ...................... F16L 1/166 405/158 |
| RE41,169 | E | 3/2010 | Arthun |
| 7,722,733 | B2 | 5/2010 | Tomasetti et al. |
| 8,056,583 | B2 | 11/2011 | Lofving et al. |
| 2005/0211373 | A1 | 9/2005 | Tomasetti et al. |
| 2008/0014503 | A1 | 1/2008 | Kejha |
| 2008/0103476 | A1 | 5/2008 | Schulte |
| 2008/0149503 | A1 | 6/2008 | Pandori |
| 2010/0282350 | A1 | 11/2010 | Lofving et al. |
| 2011/0155274 | A1 | 6/2011 | Zumbrum |
| 2012/0017733 | A1 * | 1/2012 | Gay .................... A61M 39/284 83/176 |
| 2013/0220436 | A1 | 8/2013 | Sharp et al. |
| 2014/0103077 | A1 | 4/2014 | Zumbrum |
| 2017/0009920 | A1 | 1/2017 | Canatella |
| 2018/0274318 | A1 | 9/2018 | Birkeland |

FOREIGN PATENT DOCUMENTS

| | | | |
|---|---|---|---|
| CA | 2996267 | A1 | 6/2017 |
| DE | 102015106623 | A1 | 11/2016 |
| DK | 3387213 | T3 | 5/2021 |
| EP | 2677223 | A1 | 12/2013 |
| EP | 3387213 | A1 | 10/2018 |
| KR | 10-2013-0131880 | A | 12/2013 |
| NO | 343423 | B1 | 3/2019 |
| RU | 2689935 | C1 | 5/2019 |
| WO | 99/64837 | A1 | 12/1999 |
| WO | 2008088544 | A2 | 7/2008 |
| WO | 2010/008396 | A2 | 1/2010 |
| WO | 2017/099607 | A1 | 6/2017 |

OTHER PUBLICATIONS

European Search report and Search opinion of the European Patent Office dated Jan. 7, 2020 for related European Patent Application No. 19186842.1, 6 pages.

International Preliminary Report on Patentability of the International Searching Authority dated Jan. 27, 2022 for related PCT Application No. PCT/US2020/042272, 6 pages.

International Search Report and Written Opinion of the International Searching Authority dated Oct. 30, 2020 for related PCT Application No. PCT/US2020/042272, 7 pages.

Extended European Search Report for EP20840840 issued Sep. 14, 2023, 6 pages.

* cited by examiner

FLUID-TIGHT SEPARATING CLOSURE

TECHNICAL FIELD

The subject matter of the invention relates to a method and a device for forming a fluid-tight separating closure of a conduit with a sleeve surrounding the conduit.

In the production and processing of various products it is often necessary to remove a fluid from a closed process system or to add fluid to the system. The fluid may be, for example, a liquid. Such a need exists for example in the production and processing of biopharmaceuticals, pharmaceuticals, or other biotechnology applications during which a production process is carried out in process vessels. Such a need may also exist, for example, in the production of food, paints or chemicals, to name only a few. The problem with the transfer of a fluid is the need for the adding or removal of the fluid to be done in an aseptic, hygienic, and/or sterile manner.

PRIOR ART

From WO 2010/008396 A2 there is known a flexible conduit, comprising a plastically deformable sleeve. The plastically deformable sleeve surrounds and is attached to the conduit. The conduit may be a tube or a hose. By a pressure exerted on the sleeve, the sleeve and the hose or the conduit are deformed in order to seal off the conduit, while by applying further pressure to the sleeve, the sleeve and the conduit are severed, the conduit being substantially fluid-tight in the compressed region. The compressing and the separating of the sleeve and the conduit are done at the same time.

From the document US RE 41,169 E there is known a hand tool which is used to form a fluid-tight separating closure of a conduit with a sleeve surrounding the conduit. The hand tool has two oppositely situated jaws, between which the conduit with the sleeve is positioned. A first tool jaw has a cutting tool, which is oriented in the direction of the opposite second tool jaw. Webs are provided on either side of the cutting tool. If the tool jaws are moved toward each other, the sleeve and the hose will be sliced and compressed. A comparable design of a hand tool is known from the document US 2008/014503 A1.

The concept known from these documents is transferred to an electrohydraulic tool, as is known from DE 10 2015 106 623 A1.

Starting from this prior art, the problem which the present invention proposes to solve is to indicate a method as well as a device for the forming of a fluid-tight separating closure of a conduit with a sleeve surrounding the conduit by which an increased process safety can be accomplished.

PRESENTATION OF THE INVENTION

This problem is solved by a method for forming of a fluid-tight separating closure of a conduit according to the independent method claim and by a device with the features of independent apparatus claim.

Advantageous embodiments and modifications of the method and the device are the subject matter of the dependent claims.

According to the invention a method is provided for the forming of a fluid-tight separating closure of a conduit involving the following steps:

- providing of a conduit with a sleeve, wherein the sleeve is preferably attached to the conduit,

- positioning of the conduit with the sleeve between a die and a stamp,
- compressing of the sleeve by a relative movement between the die and the stamp in order to form a closure;
- severing of the closure in a compressed region by a severing tool such that a contact line between the severing tool and the sleeve during severing is shorter than an obtained severing edge of the sleeve.

Thanks to this method according to the invention, a better process safety is achieved, since a severing of the closure in a compressed region substantially only occurs when a substantially fluid-tight separating closure has already been achieved. Therefore, no germs, particles, contaminants, etc., can be introduced by the severing tool into the conduit during the severing. On the other hand, contamination of the surroundings by a fluid escaping from the conduit is also prevented, since the fluid located in the conduit is forced out of the compressed region and from the closure by the compression, which occurs substantially prior to the severing.

The described method can be applied in particular in the production and processing of biopharmaceuticals, pharmaceuticals, or other biotechnology applications during which a production process is carried out in process vessels.

The severing of the closure is preferably performed after the compressing of the sleeve. The severing is performed using a severing tool that preferably has a blade for severing. During severing a contact line between the severing tool and the sleeve is shorter than an obtained severing edge of the sleeve. This condition is preferably fulfilled during the entire severing.

The contact line is where the severing tool is in contact with the surface of the sleeve at a certain time. That is, during severing the contact line can vary in position and/or in length. For example, if a plane blade is placed onto a surface such that during severing the entire blade is in contact with the surface at the same time, the contact line extends along the entire edge of the blade. In a different example, the contact line can be significantly smaller than the extension of the blade. In particular, the contact line can be a single contact point. Therein, a point is considered a very short line. For example, in cutting a piece of paper by a blade there is usually only a single contact point between the blade and the paper.

The cutting line according to the present invention does not have to be continuous. It is even preferred that contact between the severing tool and the sleeve is first established at the outmost portions of the sleeve such that at the beginning of the severing there are two short sections of the contact line that are spaced apart from each other. In case the contact line is not continuous, the length of the contact line is the sum of all parts of the contact line.

The severing edge is the result of the severing. After the sleeve has been severed by the severing tool, the remaining part of the sleeve has an edge that has not been there before the severing. This edge is considered the severing edge. The severing edge is the edge of the severed sleeve on that side of the sleeve from where the severing tool has been brought into contact with the sleeve. Since the sleeve is separated into at least two parts it is noted that both parts of the sleeve can equally be considered for determining the severing edge. This is due to the fact that by severing a sleeve into two pieces the obtained edges on the two parts correspond to each other and, in particular, have the same length.

According to the present invention the contact line is shorter than the obtained severing edge. That means that the severing is not performed by placing a blade onto the surface such that the entire blade is in contact with the surface and the sleeve is cut by equally applying a pressure onto the blade. Such a cutting would require a very high force and would not be sufficiently reproducible. Instead, different parts of the severing edge are obtained at different times of the severing. That way, only part of the sleeve has to be cut at the same time. Thus, a lower force is required to be applied. This can reduce the size of the used device because, for example, lower hydraulic pressure is sufficient for moving the severing tool. Providing high hydraulic pressures usually requires particularly heavy devices. Thus, weight can be saved so that the device can be configured as a mobile device. Also, a lower force requires less energy such that energy can be saved. Further, with a reduced required minimum force for severing the sleeve can be severed particularly fast. This is due to the fact that it a small minimum force can easily be exceeded. If a force is applied that is larger than necessary, a particularly fast severing can be achieved. Also, more reliable and reproducible results can be obtained if only a small force is required for severing.

According to an advantageous embodiment of the method a length of the contact line is at most 90% of a length of the obtained severing edge.

The described condition is preferably fulfilled during the entire severing. By restricting the length of the contact line to at most 90% of the severing edge the above described effect can be achieved to an extent that is sufficient for many applications. Above 90% the situation might be too close to bringing an entire blade into contact with the surface. It is even more preferred that a length of the contact line is at most 75% of a length of the obtained severing edge.

It is even possible that the contact line is much smaller than the severing edge. The contact line can even be a single contact point, that is a very short contact line. It is thus preferred that a length of the contact line is at most 10% of a length of the obtained severing edge, more preferred only 5%. This condition is also preferably fulfilled during the entire severing. By having such a short contact line only, the severing is not performed all at once. In contrast, one part of the severing edge is obtained after the other. Thereby, the force required for severing can be reduced significantly.

According to another advantageous embodiment of the method a central portion of the severing edge is formed at an end of the severing.

In this embodiment the severing begins at the outmost portions of the sleeve. After these portions have been severed, the central portion of the sleeve is severed. This way, the cutting edge is obtained starting from two sides of the sleeve, wherein two branches of the cutting edge both spread towards the central portion of the sleeve. The severing is complete when the two branches meet and merge together in the central portion. By having two branches of the cutting edge, a particularly small force can be applied in a symmetric manner. Thus, a small fore can be used particularly efficiently. Also, the severing can be particularly fast because two branches of the severing edge are obtained simultaneously.

The described way of severing can be achieved, for example, with a plane blade and a curved die. The sleeve is compressed into the die so as to adapt the curved shape of the die. The die is preferably curved such that after compressing the sleeve the outmost portions of the sleeve are closer to the blade than the central portion of the sleeve. If the blade is moved towards the sleeve, the outmost portions of the sleeve are severed first and the central portion last. Alternatively, the sleeve could be compressed so as to have a plane surface, which can be severed by a curved blade.

According to another advantageous embodiment of the method the stamp and the severing tool are moved relative to the die independently of each other.

Due to the independent movement of the stamp and the severing tool the compressing and severing of the sleeve can be performed independently. This is advantageous because this way the compressing can be terminated before the severing begins such that a contamination of substances within the conduit can be ruled out.

According to another advantageous embodiment of the method the severing is done by cutting or punching.

A severing of the closure in the compressed region occurs preferably by cutting or punching. Severing by means of a cutting process has the advantage that no waste products are produced. If the conduit and the sleeve surrounding the conduit are bodies of relatively large diameter, it is advantageous, but not necessary, to perform the severing by punching. If the severing of the closure is done in a compressed region by punching, it is advantageous for the stamped part produced by punching to be taken to a catching container.

According to another advantageous embodiment of the method the compressing is limited such that the compressed region of the sleeve acquires a predefined shape.

If the force applied to the sleeve during compressing is too high, the sleeve and/or the conduit might break or burst. Thereby, the conduit might be separated into two pieces as required; however, a contamination of substances within the conduit cannot be ruled out. Thus, a breaking or bursting of the sleeve and/or of the conduit is supposed to be avoided. This can be achieved by limiting the compressing of the sleeve. For example, a device used for performing the described method may comprise a stop for the stamp. That way, there is a predefined minimum space for the sleeve and the conduit, regardless of how large a force is used for compression. If the sleeve and the conduit are compressed into this predefined space, the sleeve acquires a predefined shape that corresponds to the predefined space. With the sleeve having the predefined space, also the severing can be performed with a predefined contact between the sleeve and the severing tool. Thereby, a particularly high reproducibility is achievable.

According to a further aspect of the invention a device is provided for forming a fluid-tight separating closure of a conduit with a sleeve surrounding the conduit. The device comprises:

- a die and a stamp, wherein the die and the stamp can be moved relative to each other in order to form a closure, and
- a severing tool for a severing of the closure in a compressed region, wherein the stamp and the severing tool are movable relative to the die independently of each other.

The device is preferably configured for performing the described method. The described method is preferably performed using the described device. The features and advantages described for the method can be transferred to the described device, and vice versa.

With the stamp and the severing tool being movable independently of each other, the above described condition can easily be fulfilled that the contact line between the severing tool and the sleeve is shorter than the obtained severing edge. If the die and the severing tool were moved simultaneously, the entire severing tool would be likely to be brought into contact with the surface. That way, the advantages of the described method could not be achieved.

According to an advantageous embodiment of the device the severing tool is a knife or a punching stamp.

According to another advantageous embodiment of the device the severing tool is arranged within the stamp.

In this embodiment the severing tool can be accommodated within the stamp such that the device can be particularly compact and small. Also, compressing and severing can be performed particularly efficiently if the severing tool is arranged within the stamp because after compressing the stamp can remain in place, while the severing tool is used to sever the sleeve. Thereby, the stamp can hold the sleeve in place such that no further holding means are necessary.

According to another advantageous embodiment of the device the severing tool and the stamp jointly form a compression surface for compressing the sleeve, and wherein the severing tool can be moved so as to protrude from the compression surface for severing the closure.

The severing tool and the stamp jointly form the compression surface for compressing the sleeve in a compression state. Therein, the compression tool is received within the stamp and does not protrude from the compression surface. For severing the sleeve the severing tool can be moved out of the compression state such as to protrude from the compression surface. This way, the device can be particularly compact and small. With the severing tool and the stamp jointly forming the compression surface, there is no gap for the severing tool within the stamp. Such a gap would be disadvantageous for compression. A smooth surface without any gaps is best for compressing the sleeve. Further, the configuration according to the present embodiment is particularly save because the severing tool can be hidden when not used for severing.

According to another advantageous embodiment of the device the severing tool has a blade with a shape that has at least one of the following features:

a straight line,
a curved line,
a curved line with a protruding central region,
a curved line with multiple recesses.

The features listed above can be combined with each other in any manner. Particularly preferred is the embodiment in which the severing tool has a blade that has the shape of a straight line. Therein, the blade preferably has no further features such as protrusions or recesses. Also, it is particularly preferred that the blade has the shape of a curved line with a protruding central region as the only shape feature.

According to another advantageous embodiment of the device the die has a curved receiving surface for receiving the sleeve.

In this embodiment the above described condition that during severing the contact line between the severing tool and the sleeve is shorter than an obtained severing edge of the sleeve can be fulfilled easily because the sleeve is compressed such that the outmost portions of the sleeve are closer to the severing tool than the central portion of the sleeve. That way the outmost portions of the sleeve are severed first and the central portion last.

According to another advantageous embodiment of the device the die has a receiving surface for receiving the sleeve, and wherein the severing tool has a blade, and wherein the shapes of the receiving surface and the blade deviate from each other.

In this embodiment it is further facilitated that during severing the contact line between the severing tool and the sleeve is kept shorter than the obtained severing edge of the sleeve.

If the receiving surface and the blade would have matching shapes, the contact line would likely be particularly long.

According to another advantageous embodiment the device further comprises a stop for limiting the movement of the die and the stamp relative to each other.

According to another advantageous embodiment the device further comprises a first hydraulic cylinder for moving the stamp and a second hydraulic cylinder for moving the severing tool.

It is preferred that the first hydraulic cylinder and the second hydraulic cylinder are arranged together in a hydraulic cylinder unit. In particular, the first hydraulic cylinder can be arranged so as to surround the second hydraulic cylinder in a concentric manner. Alternatively, the second hydraulic cylinder can be arranged so as to surround the first hydraulic cylinder in a concentric manner. The first hydraulic cylinder and/or the second hydraulic cylinder are preferably configured as telescope cylinders.

The first hydraulic cylinder and the second hydraulic cylinder are preferably configured so as to be usable independently of each other so that the stamp and the severing tool can be moved independently of each other.

According to another advantageous embodiment of the device the die is configured in a pivotable manner.

In this embodiment the device can be particularly small, in particular in view of a distance between the die and the stamp. Having a small distance between the die and the stamp is advantageous because the smaller this distance is, the more stable the device can be. In particular when high forces are applied it is advantageous that the device is as compact as possible. Otherwise, large lever arms could increase the applied forces even further and could, eventually, result in a damage of the device. The required minimum distance between the die and the stamp is basically a result of the diameter of the sleeve before the compressing. However, it might not be sufficient to have the die and the stamp spaced apart from each other at a distance equal to the diameter of the sleeve before compressing. This is due to the fact that it must be possible to place the sleeve in between the die and the stamp. The conduit with the sleeve can be placed between the die and the stamp via a loading opening that is sufficiently large such that the conduit and the sleeve can fit through the loading opening. In particular with a curved receiving surface of the die, providing a sufficiently large loading opening might only be possible if the distance between the die and the stamp is significantly larger than the diameter of the sleeve before the compressing.

In the present embodiment the distance between the die and the stamp can be particularly small due to the fact that the die can be brought into a loading position, wherein the conduit with the sleeve can be loaded into the device. That is, by pivoting the die into the loading position a particularly large loading opening can be obtained.

In the present embodiment the die is preferably configured in a pivotable manner such as to be pivotable between a loading state for positioning the conduit with the sleeve between the stamp and the die and an operation state for compressing and severing the sleeve. In the operation state the die is preferably arranged such as would be the case with a die that is fixedly attached to the device, that is a die that is configured in a non-pivotable manner. In the operation state the die is arranged such that the compressing and severing according to the described method can be performed. In the loading state the device can be loaded with the sleeve that surrounds the conduit. That is, the loading state is supposed to be used for the positioning of the conduit with the sleeve between the die and the stamp.

It is preferred that the die can be locked in the operation state and/or in the loading state. In particular, locking the die in the operation state has the advantage that during operation, that is doing compressing and severing of the sleeve, the die cannot move. That is, the die can be used efficiently as a counterpart for the stamp.

It is preferred that the die is configured such that a retaining force acts on the die such as to pivot the die into the operation state. This can be achieved, for example, by means of a spring that is attached between the die and a further element of the device. Due to the retaining force the die is generally kept in the operation state, from where it can be pivoted for loading the device. After loading, without any further action required, the die is pivoted back into the operation state due to the retaining force.

Further benefits and details of the method and the device will be explained with the aid of the exemplary embodiments presented in the drawings, without the subject matter of the invention being limited to these exemplary embodiments.

BRIEF DESCRIPTION OF THE FIGURES

FIG. 1*a* to 1*f* show schematic illustrations of a severing according to the method of the present invention. Starting with FIG. 1*a*, a severing tool 7 is lowered onto a sleeve 2. At first, the severing tool 7 is brought into contact with the outermost portions of the sleeve 2 such that two short sections of a contact line 8 are formed (FIG. 1*b*). Therein, a central portion 10 of the sleeve is not yet in contact with the severing tool 7. With the severing tool 7 being lowered further, the sections of the contact line 8 become longer such that a length $L_c$ of the contact line 8 can be seen (FIG. 1*c*). The length $L_c$ is the sum of the lengths of the two sections of the contact line 8. Subsequently, also the central portion 10 of the sleeve contacts the severing tool 7 (FIG. 1*d*). Therein, the two sections of the contact line 8 merge. Finally, the entire sleeve is severed (FIG. 1*e*) and the severing tool 7 can be removed (FIG. 1*f*). By means of the described severing a severing edge 9 is obtained. The length $L_{SE}$ thereof is longer than the length $L_c$ of the contact line 8. This condition is fulfilled at all times during severing. As indicated in FIG. 1*f*, the length $L_{SE}$ of the severing edge 9 is measured along a curved line on the upper surface of the sleeve 2.

FIGS. 2 and 3 show views of a conduit 1 with a compressed sleeve 2. The severing shown in FIG. 1*a* to 1*f* can be performed with the shown conduit 1 and sleeve 2 in a compressed region 6, by means of which a closure 5 is formed.

FIGS. 4 to 8 show views of a device 11 for forming a fluid-tight separating closure of a conduit 1 with a sleeve 2 surrounding the conduit 1. The device 11 can be used with the conduit 1 and the sleeve 2 shown in FIGS. 2 and 3. Thereby, the closure 5 shown in FIGS. 2 and 3 can be obtained. Further, the severing depicted in FIG. 1*a* to 1*f* can be performed using the device 11 of FIGS. 4 to 8.

The device 1 comprises

Figure 8:
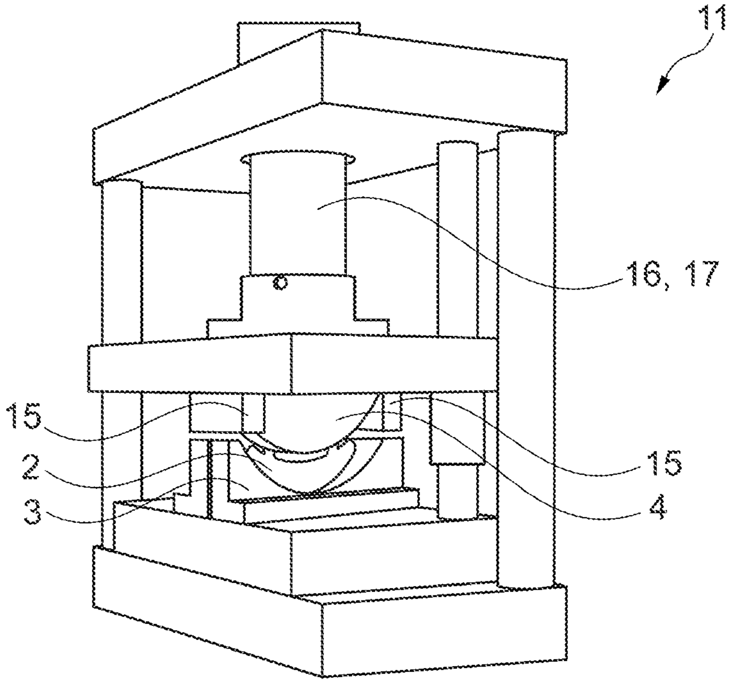
Figure 9:
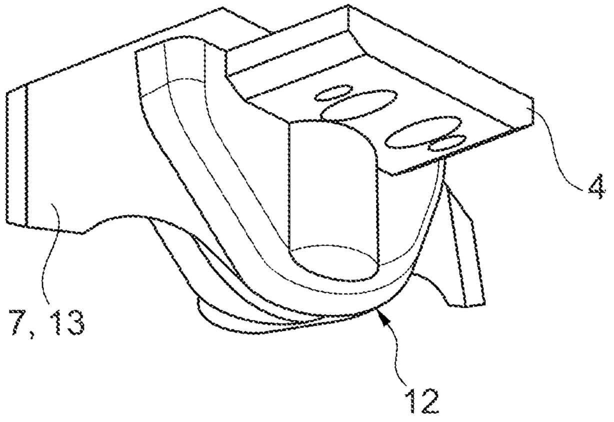
FIGS. 9, 10*a* and 10*b*: views of the stamp and the severing tool of the device of FIGS. 4 to 8, FIG. 11*a* to 11*f*: views of different blades for the device of FIGS. 4 to 8.
Figure 10A:
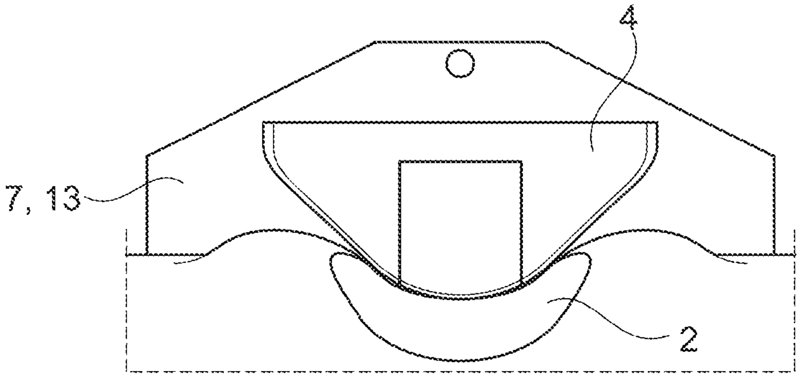
Figure 10B:
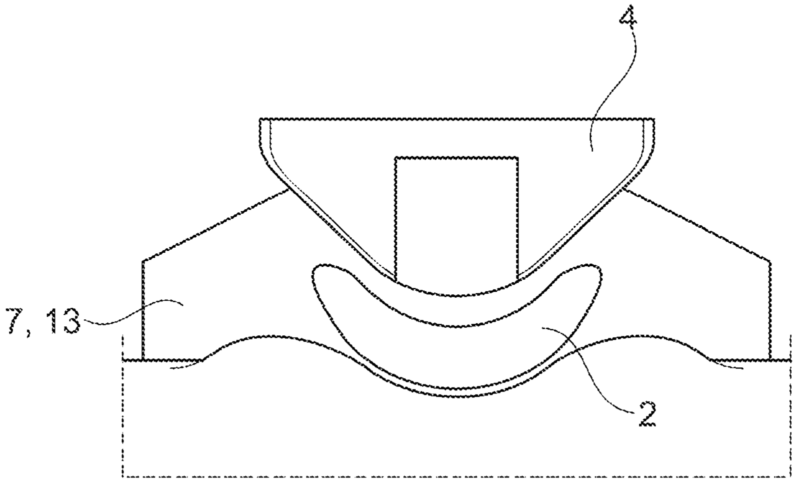

- a die 3 and a stamp 4, wherein the die 3 and the stamp 4 can be moved relative to each other in order to form the closure 5, and
- a severing tool 7 for a severing of the closure 5 in a compressed region 6, wherein the stamp 4 and the severing tool 7 are movable relative to the die 3 independently of each other. The severing tool 7 is arranged within the stamp 4 and hence not visible in FIGS. 4 to 8. In FIGS. 9, 10*a* and 10*b* the severing tool 7 is shown.

With the device 11 a method can be performed for the forming of the fluid-tight separating closure of the conduit 1 involving the following steps:

- providing of the conduit 1 with the sleeve 2,
- positioning of the conduit 1 with the sleeve 2 between the die 3 and the stamp 4,
- compressing of the sleeve 2 by a relative movement between the die 3 and the stamp 4 in order to form the closure 5;
- by cutting or punching, severing of the closure 5 in a compressed region 6 by a severing tool 7 such that—as shown in FIG. 1*a* to 1*f*—the contact line 8 between the severing tool 7 and the sleeve 2 during severing is shorter than the obtained severing edge 9 of the sleeve 2. The length of the contact line 8 is at most 90% of a length of the obtained severing edge 9. The central portion 10 of the severing edge 9 is severed at an end of the severing.

Figure 1A:
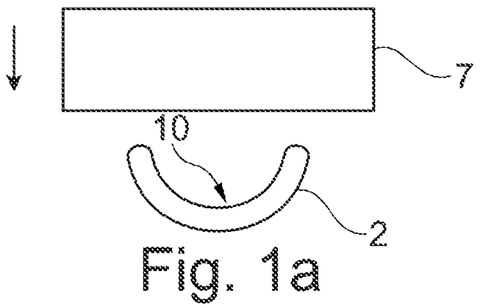
FIG. 1*a* to 1*f*: schematic illustrations of a severing according to the method of the present invention.
Figure 1B:
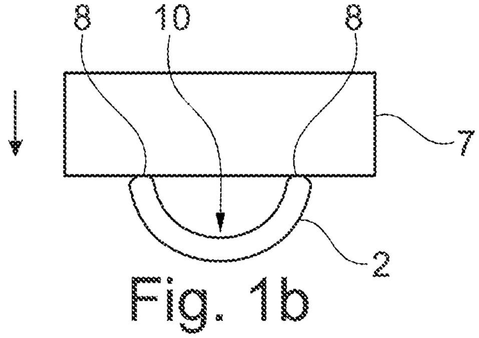
Figure 1C:
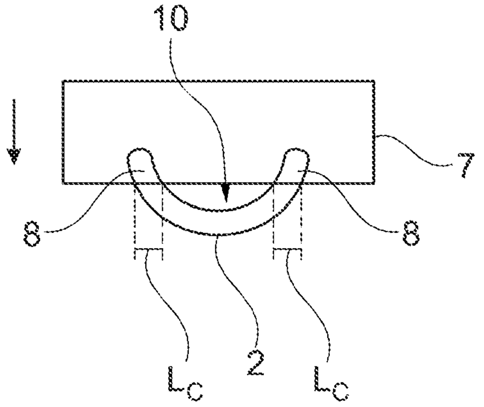
Figure 1D:
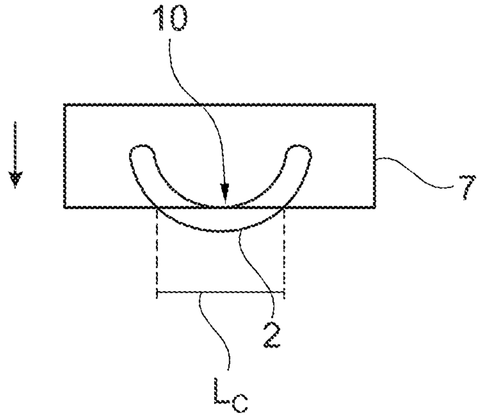
Figure 1E:
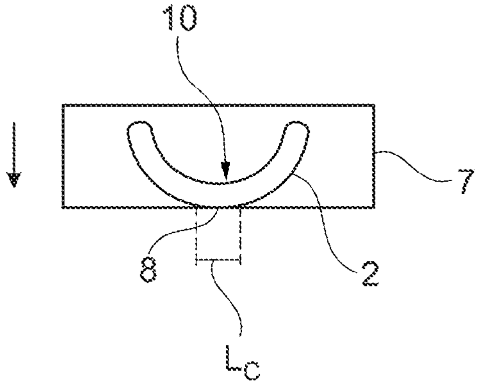
Figure 1F:
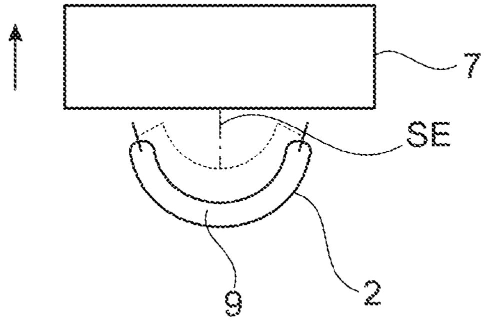
Figure 2:
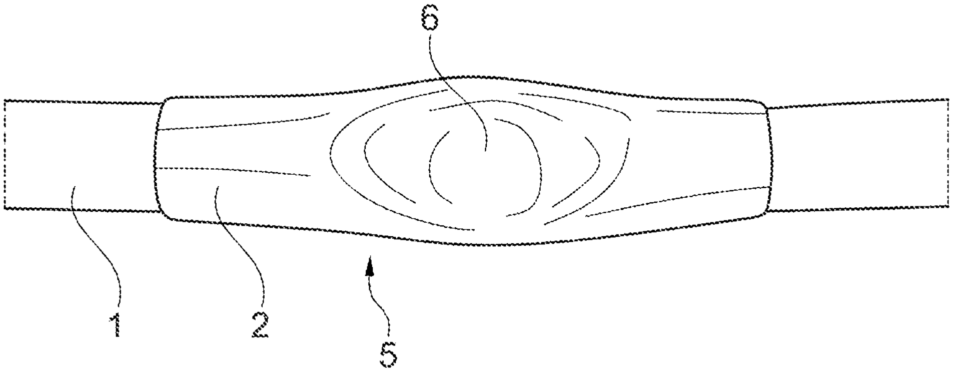
FIGS. 2 and 3: views of a conduit with a compressed sleeve.
Figure 3:
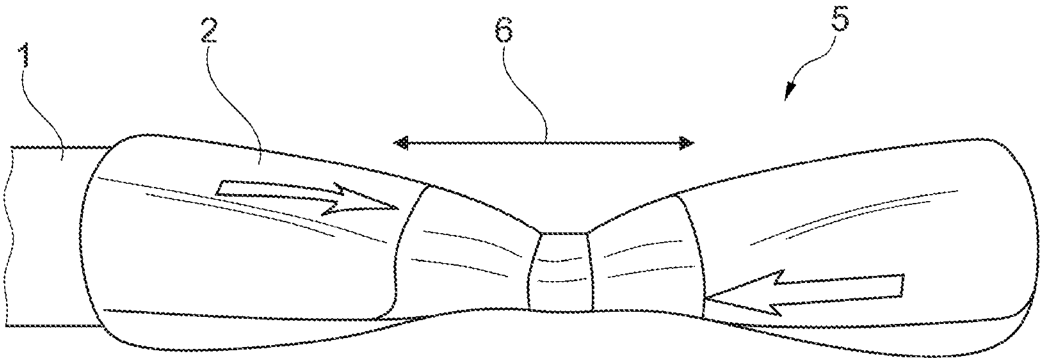
Figure 4:
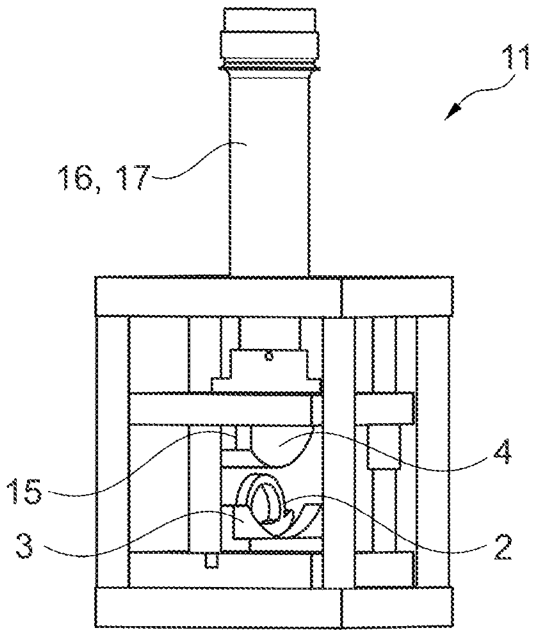
FIGS. 4 to 8: views of a device according to the present invention.
Figure 5:
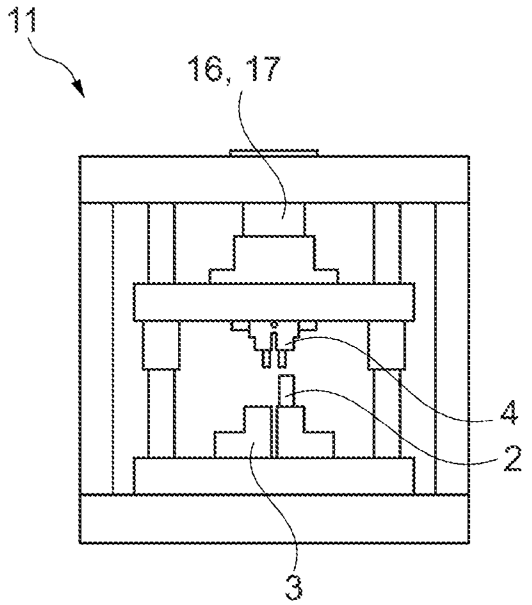
Figure 6:
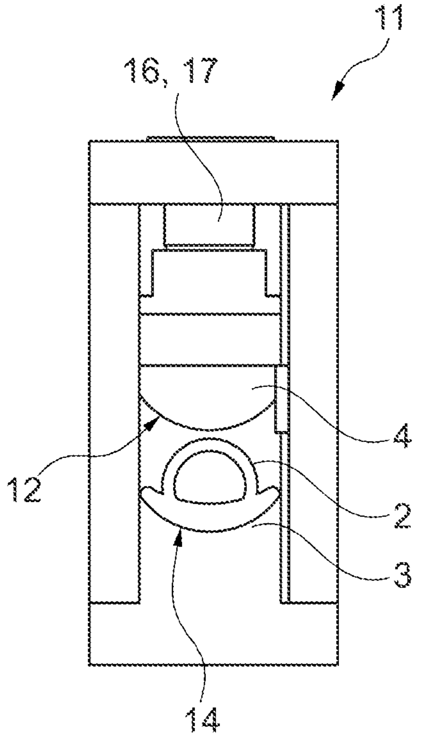

FIG. 4 is a perspective view of the device 11 with a sleeve inserted into the die 3 prior to compressing. For clarity, the conduit 1 is not shown. FIGS. 5 and 6 are corresponding side views.

Figure 7:
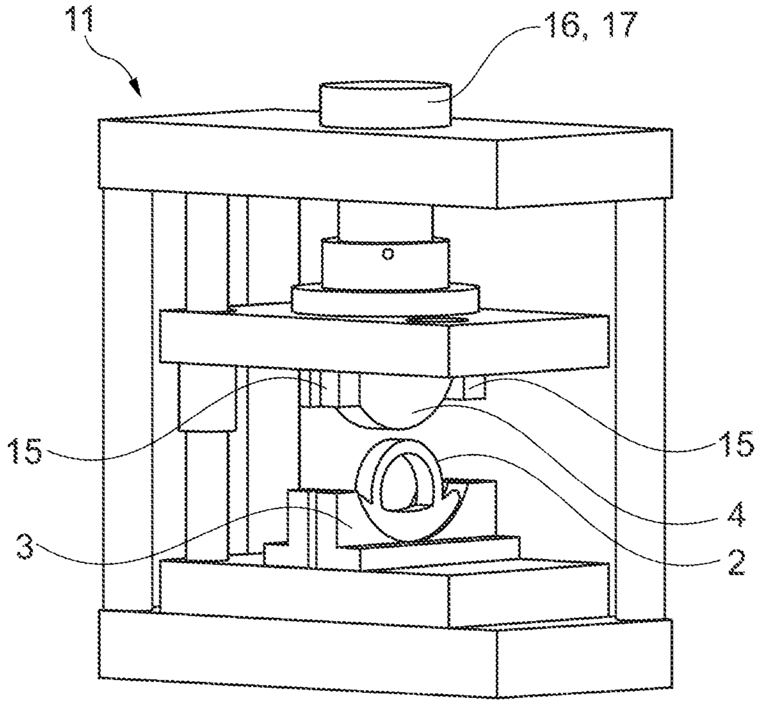

FIG. 7 is a further perspective view of the device 11 prior to compressing. FIG. 8 is a perspective view after compressing. It can be seen that between the situations shown in FIGS. 7 and 8 the sleeve 2 has been compressed by the stamp 4 and the die 3.

In the shown device 11 the severing tool 7 is a knife, but could also be a punching stamp. From FIG. 6 it can be seen that the severing tool 7 is arranged within the stamp 4 such that the severing tool 7 and the stamp 4 jointly form a compression surface 12 for compressing the sleeve 2, wherein the severing tool 7 can be moved so as to protrude from the compression surface 12 for severing the closure 5. Also from FIG. 6 it can be seen that the die 3 has a curved receiving surface 14 for receiving the sleeve 2. The severing tool 7 has a blade 13, wherein the shapes of the receiving surface 14 and the blade 13 deviate from each other. The blade is shown in FIGS. 9, 10*a*, 10*b* and 11*a* to 11*f*.

As can be seen from FIGS. 4, 7 and 8, the device 11 further comprises a stop 15 for limiting the movement of the die 3 and the stamp 4 relative to each other.

The device further comprises a first hydraulic cylinder 16 for moving the stamp 4 and a second hydraulic cylinder 17 for moving the severing tool 7.

FIGS. 9, 10*a* and 10*b* show views of the stamp 4 and the severing tool 7 of the device 11 of FIGS. 4 to 8. The severing tool 7 has a blade 13.

FIG. 9 is a perspective view, wherein the blade is received within the stamp 4 such that the blade 13 of the severing tool 7 and the stamp 4 jointly form a compression surface 12 for compressing the sleeve 2. This situation is also shown in FIG. 10*a* as a side view of the stamp 4, the blade 13 of the severing tool 7 and the sleeve 2. The sleeve 2 is shown in a compressed state. The blade 13 of the severing tool 7 can be moved out of the stamp 4 so as to protrude from the compression surface 12 for severing the sleeve 2. This is shown in FIG. 10*b*.

Figure 11A:
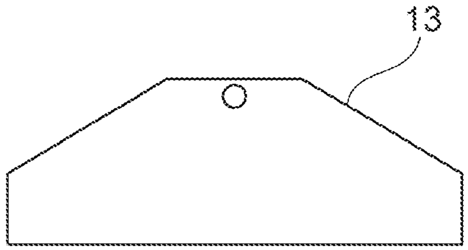
Figure 11B:
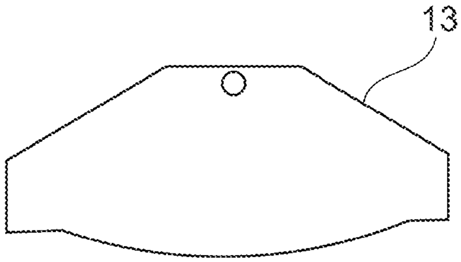
Figure 11C:
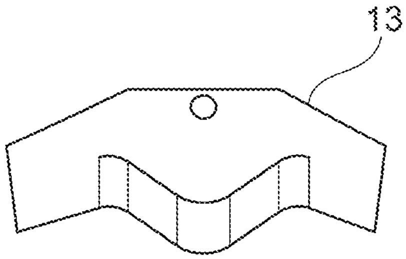
Figure 11D:
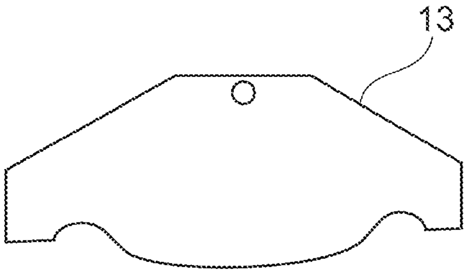
Figure 11E:
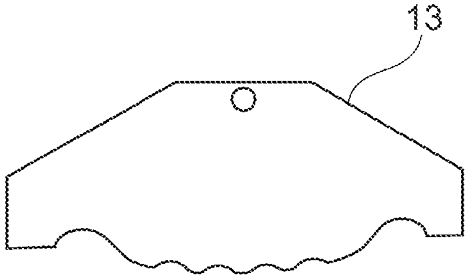
Figure 11F:
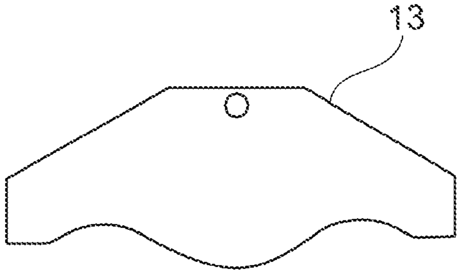

FIG. 11*a* to 11*f* show six views of different blades 13 for the device 11 of FIGS. 4 to 8. In FIG. 11*a* the blade 13 has the shape of a straight line. In FIG. 11*b* the blade 13 has the shape of a curved line with a protruding central region. In FIG. 11*c* to 11*f* the blade 13 has the shape of a curved line with multiple recesses.

Figure 12A:
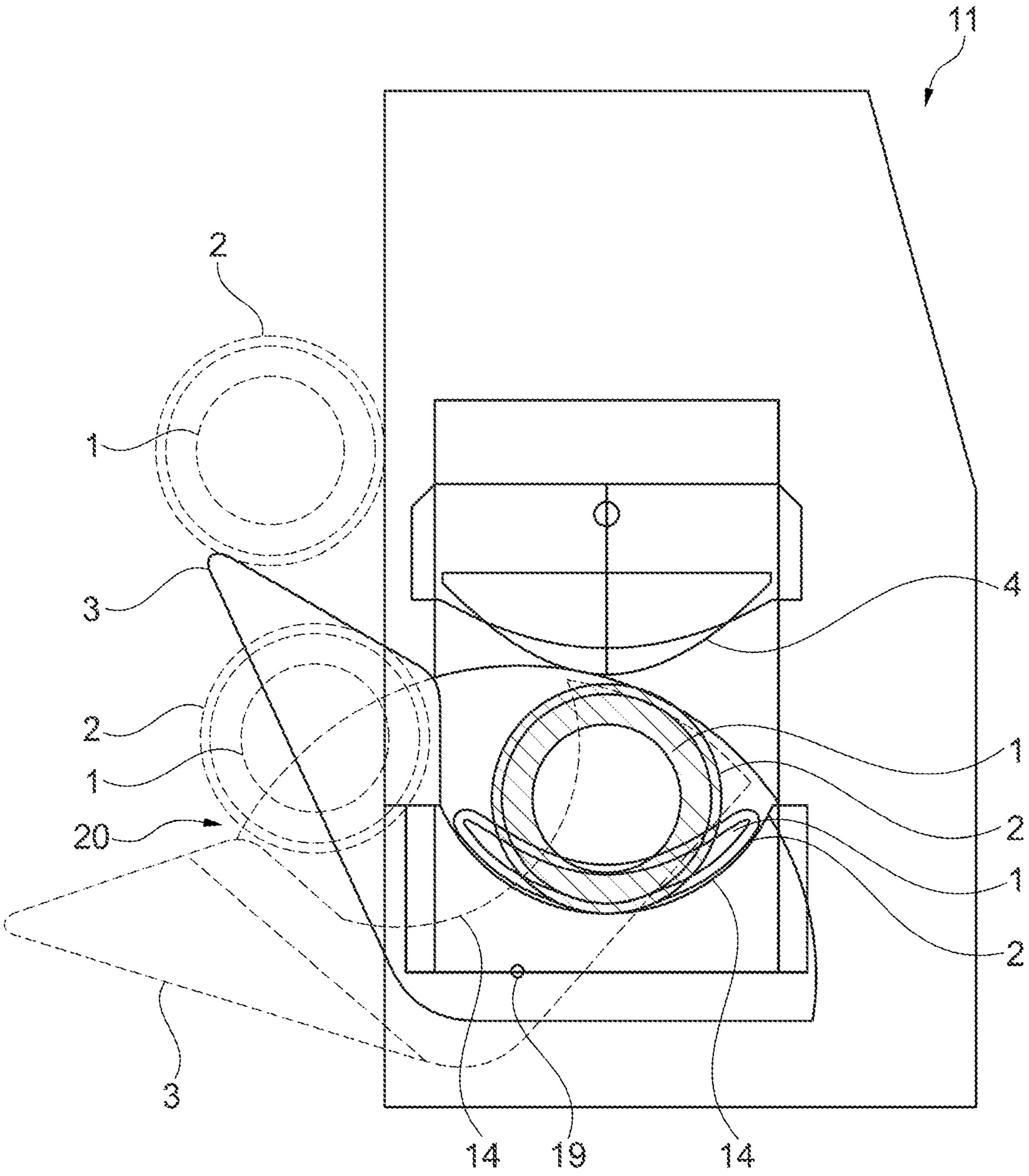
FIGS. 12*a* and 12*b*: views of a device according to the present invention, wherein the die is configured in a pivotable manner.
Figure 12B:
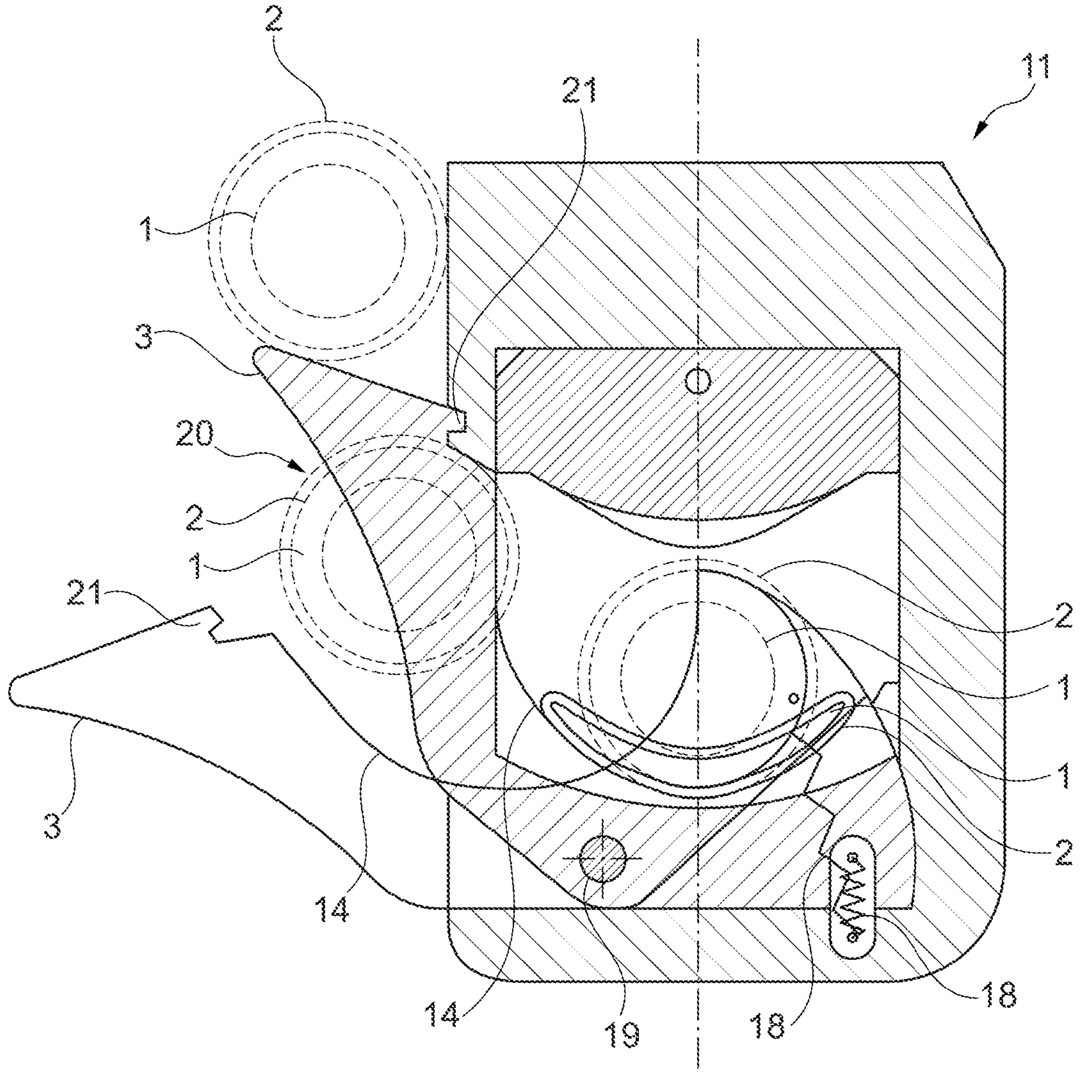

FIGS. 12*a* and 12*b* show two embodiments of a device 11 for forming a fluid-tight separating closure of a conduit 1 with a sleeve 2 surrounding the conduit 1. Unless specified otherwise, the devices 11 shown in FIGS. 12*a* and 12*b* have the same features that have been described before. In the devices 11 shown in FIGS. 12*a* and 12*b* the die 3 is configured in a pivotable manner. Therefore, a pivot point 19 is indicated in the figures. The die 3 can be pivoted around the pivot point 19. Thereby, the die 3 can be pivoted between a loading position (indicated by the die 3 in dashed lines) and an operation state (indicated by the die 3 in solid lines). Although in FIGS. 12*a* and 12*b* the die 3 is shown twice (once in dashed lines and once in solid lines), the devices 11 actually comprise only one die 3, which is shown in two different states.

The conduit 1 with the sleeve 2 can be moved towards the die 3 as indicated by the upper conduit 1 and sleeve 2 in dashed lines in FIG. 12*a*. Then, the die 3 can be pivoted into the loading state, which is indicated by the die 3 in dashed lines. This can be done, for example, by pushing the conduit 1 with the sleeve 2 against the die 3. If the die 3 is in loading state the conduit 1 and the sleeve 2 can be moved through a loading opening 20. This is indicated in FIG. 12*a* by the lower conduit 1 and sleeve 2 in dashed lines. Afterwards, the die 3 can be brought into the operation state, which is indicated by the die 3 in solid lines. In this state the compressing and severing can be performed. This is indicated in FIG. 12*a* by means of the conduit 1 and sleeve 2 in solid lines in a non-deformed state before compressing and severing and in a deformed state after compressing and severing.

In FIG. 12*b* a device 11 is shown that are similar to the device 11 of FIG. 12*a*. Only the differences are explained. The device 11 comprises a spring 18, by means of which the die 3 can be moved into the operation state. The spring 18 is shown in FIG. 12*b* twice, once for the operation state (wherein the spring 18 is not extended) and once for the loading state (wherein the spring 18 is extended). The device 11 actually comprises only one spring 18. Further, a lock 21 is shown, by means of which the die 3 can be locked in the operation state.

Figure 13:
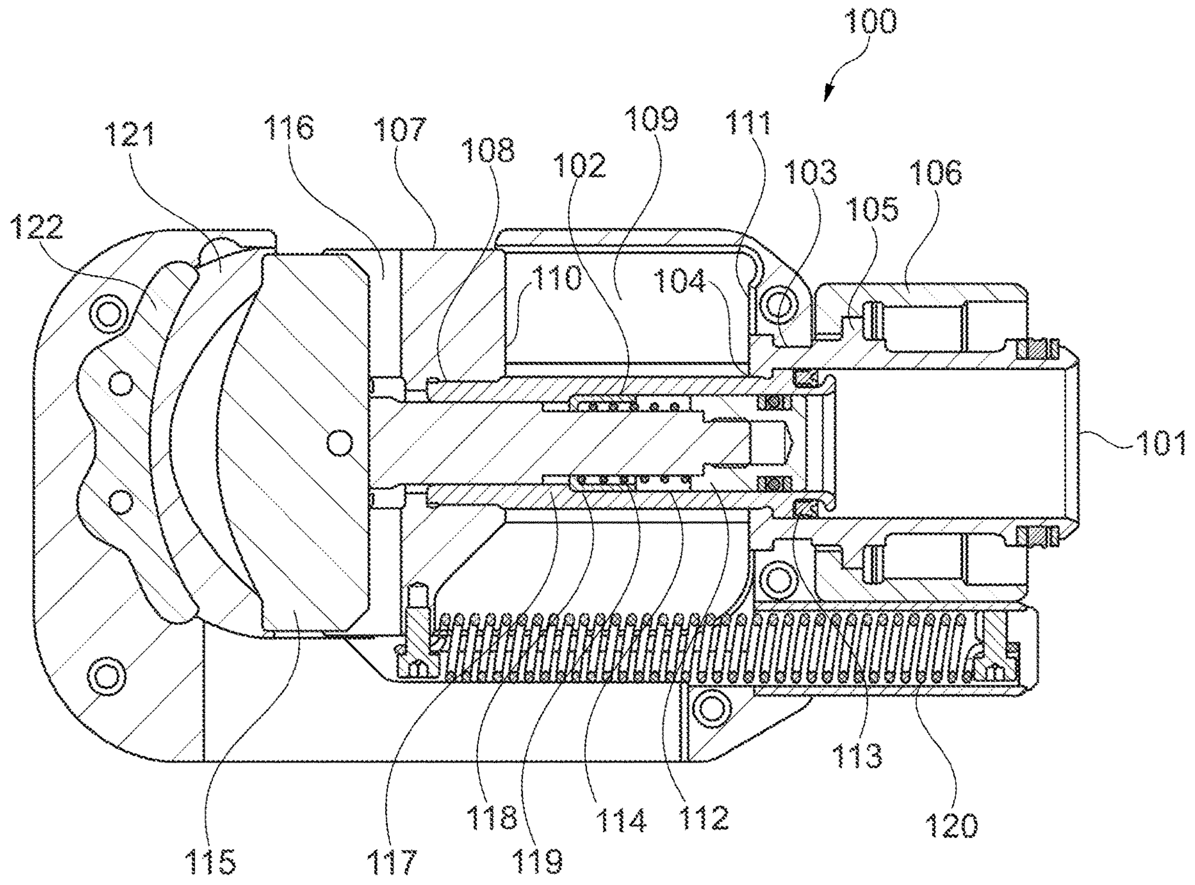
FIG. 13: sectional side view of an operating head of an electrohydraulic apparatus.

FIG. 13 shows an operating head 100 of an electrohydraulic apparatus which is suitable, and intended, in particular for single-handed operation. The operating head 100 has a cylinder 101, which is connected to the operating head in a fixed position. A piston 102 can be moved within the cylinder 101. The cylinder 101 has an opening 104, which is delimited by a collar 103. The piston 102 extends through the opening 104. On its end portion, which projects into the cylinder 101, the piston 102 has a seal 105, by means of which the piston 102 is sealed in relation to the cylinder 101. The seal 105 is a radial shaft seal, which is supported on an encircling flange 106.

In the position illustrated in FIG. 13 the flange 106 butts against the collar 103, and this therefore delimits the travel path of the piston 102.

The free end region of the piston 102, that is to say the region which is located opposite the region located in the cylinder 101, is connected to a stamp 107 directly or indirectly. The stamp 107 is connected to the end region 108 preferably in a releasable manner.

The operating head 100 has guide means (not illustrated specifically) for the purpose of guiding the stamp 107. The guide means can be, for example, a tongue/groove guide. It is also possible for the operating head 100 to have an accommodating space 109, into which the stamp 107 can be introduced at least to some extent. However, in the operating state of the operating head 100, the stamp 107 cannot be moved out of the accommodating space 109. Preferably the maximum displacement path of the piston 102 is dimensioned correspondingly for this purpose. The distance between the rear side of the stamp 107 and the side surface 111 of the accommodating space 109, said surface running essentially parallel to the rear side 110, is greater than the maximum possible displacement path of the piston 102.

The piston 102 is designed in the form of a hollow cylinder. The piston 102 contains a piston 112, which can be moved in an axial direction of the piston 102. The piston 112 has seals 113, which serve for sealing purposes. Thus, a hydraulic fluid cannot flow through the hollow-cylindrical piston 102.

A rod 114 is connected to the piston 112. That end portion of the rod 114 which is located opposite the piston 112 is connected to a cutting tool 115. The cutting tool 115 can be displaced in the axial direction within the stamp 107. For this purpose, the stamp 107 has a corresponding gap 116. The rod 114 and the inner end region 108 of the piston 102 are designed such that the rod 114 is guided in the piston 102.

The piston 102 contains a shoulder 117, on which a bushing 118 is supported. A compression spring 119 is provided between the piston 112 and the periphery of the bushing 118 which is oriented towards the rod 114.

It can be seen from FIG. 13 that the stamp 107 is connected to a tension spring 120. The opposite end of the tension spring 120 is connected to the operating head 100 in a fixed position.

The stamp 107 and the cutting tool 115 form a moveable jaw. A two-part die 121 is arranged opposite the stamp 107. A spacer 122 is provided between the two parts of the die 121 and therefore the gap produced in the die 121 is sufficient for the cutting tool 115 to be able to project at least to some extent into said gap.

A pressure is generated within the cylinder 101 by means of an electrically operated hydraulic unit (not illustrated). The pressure in the cylinder 101 is sufficient to displace the piston 102 out of its starting position into the end position, which is illustrated in FIG. 13. The collar 103 here forms a stop for the flange 106. Until this end position is reached, the apparatus is designed preferably such that no movement or displacement of the piston 112 takes place. If a conduit with a sleeve (not illustrated) is located between the die 121 and the stamp 107, they are compressed with one another in a fluid-tight manner. When the piston 102 reaches its end position, as is illustrated in FIG. 13, then the pressure prevailing in the cylinder 101 acts on the piston 112. The piston 112 is displaced counter to the force of the compression spring 119, as a result of which the cutting tool 115, which is connected to the piston 112 by means of the rod 114, is introduced between the parts of the die 121 and therefore the fluid-tight closure (not illustrated) is severed.

The movement of the stamp 107 tensions the tension spring 120. The movement of the piston 112 compresses the compression spring 119. Once operation as such has been completed, the pressure in the cylinder 101 is reduced. The pressure is reduced to the extent where both the tension spring 120 and the compression spring 119 are relieved of stressing. This causes the piston 112 to be displaced into its starting position. In addition, the piston 102 is returned into its starting position as a result of the tension spring 120 being relieved of stressing. The movement of the piston 112 by the compression spring 119 also results in the cutting tool 115, which is connected to the piston 112 via the rod 114, being retracted into the stamp 107, and it is therefore preferably the case that the cutting tool 115, in its starting position, does not project out of the punch.

An electrohydraulically operating tool comprising the operating head illustrated in FIG. 13 is also suitable for compressing, and severing, a conduit with a sleeve of different diameters, this resulting in a fluid-tight separation closure of the conduit. It is possible here to use conduits of different diameters with sleeves of different diameters. The collar 103 and the flange 106 delimit the displacement path of the piston 102. This delimitation of the piston 102 and corresponding dimension of the stamp 107 can define a fluid-tight separation closure of a conduit for a lower limit of the conduit and of the sleeve.

It is not imperative for the piston 102 to be displaced as far as its end position, which is illustrated in FIG. 13, by a movement of the stamp 107 when the sleeve is being compressed. If a conduit with a relatively large sleeve is introduced between the stamp 107 and the die 121, corresponding control or regulation of the pressure in the cylinder 101 can nevertheless achieve compression and severing. If, for example, a conduit has a greater external diameter, and a greater wall thickness, than the possible minimum, and if the sleeve associated with this relatively large conduit also has a correspondingly great diameter and great wall thickness, then the pressure generated in the cylinder 101 is high enough to compress the sleeve between the die 121 and the stamp 107. In this case, the collar 103 does not come into abutment against the flange 106. If the piston 102 has reached a position between the starting position and the collar 103, which can be referred to as the end position for a certain conduit-and-sleeve configuration, then the piston 112 is subjected to the pressure acting in the cylinder 101, and so the piston 112, and therefore also the cutting tool 115, causes the closure to be severed. Irrespective of the movement of the piston 112, the pressure in the cylinder 101 is kept essentially constant.

The bushing 118 serves to avoid a collision between the cutting tool 115 and the spacer 122, or generally to delimit the displacement path of the piston 112.

The end periphery of the bushing 118 thus also serves as a stop for the piston 112.

If an electrohydraulic apparatus is used with the described operating head 100 for the forming of a fluid-tight separating closure of a conduit, the piston 102 with the stamp 107 and the die 121 can be considered parts of a closure unit. Within the closure unit, the die 121 and the stamp 107 can be moved relatively to each other. If a conduit with a sleeve is provided and positioned within the closure unit between the die 121 and the stamp 107, the sleeve can be compressed by such a relative movement between the die 121 and the stamp 107 in order to form a closure. The piston 112 with the cutting tool 115 can be considered part of a separating unit. By a relative movement between the closure unit and the separating unit the closure can be severed in a compressed region.

The closure can be severed in a compressed region by the cutting tool 115 such that a contact line between the cutting tool 115 and the sleeve during severing is shorter than an obtained severing edge of the sleeve. This cannot be seen from FIG. 13 since the cutting tool 115 conceals parts of the stamp 107. Nevertheless, the above description of the method for the forming of a fluid-tight separating closure of a conduit applies to the described operating head 100 as well.

The closure unit comprising the piston 102 with the stamp 107 and the die 121 and the separating unit comprising the piston 112 with the cutting tool 115 can be considered parts of a device for forming a fluid-tight separating closure of a conduit with a sleeve surrounding the conduit.

In the embodiment depicted in FIG. 13 severing can be performed by cutting. The cutting tool 115 is preferably a knife. Alternatively, instead of the cutting tool 115 a punching stamp could be used (not shown in the figures). In that case, severing can be performed by punching. A stamped part produced by punching is preferably taken to a catching container.

LIST OF REFERENCE NUMBERS

1 conduit
2 sleeve
3 die
4 stamp
5 closure
6 compressed region
7 severing tool
8 contact line
9 severing edge
10 central portion
11 device
12 compression surface
13 blade
14 receiving surface
15 stop
16 first hydraulic cylinder
17 second hydraulic cylinder
18 spring
19 pivot point
20 loading opening
21 lock
$L_c$ length contact line
$L_{SE}$ length severing edge
100 operating head
101 cylinder
102 piston
103 collar
104 opening
105 seal
106 flange
107 punch
108 region
109 space
110 side
111 side surface
112 piston

113 seal
114 rod
115 tool
116 gap
117 shoulder
118 bushing
119 spring
120 spring
121 die
122 spacer

The invention claimed is:

1. A method for the forming of a fluid-tight separating closure of a conduit, the method comprising:

positioning a conduit with a sleeve of the conduit between a die and a stamp of a device;

compressing the sleeve by a relative movement between the die and the stamp in order to form a closure in the sleeve;

severing the closure in a compressed region by a severing tool of the device, the stamp and the severing tool moveable relative to the die independent of one another, the severing tool having a blade including a blade edge length defined as a length of a blade edge of the blade that contacts the sleeve during the entire severing, a contact line along the blade edge between the severing tool and the sleeve during severing is shorter than the blade edge length; and removing the conduit from the device with the sleeve maintaining the closure in the sleeve by retracting the stamp and the severing tool of the device.

2. The method according to claim 1, wherein the contact line between the severing tool and the sleeve during the severing define an obtained severing edge of the sleeve, a length of the contact line is at most 90% a length of the obtained severing edge.

3. The method according to claim 1, wherein a central portion of a severing edge is formed at an end of the severing.

4. The method according to claim 1, wherein the severing is done by cutting or punching.

5. The method according to claim 1, wherein the compressing is limited such that the compressed region of the sleeve acquires a predefined shape.

6. The method according to claim 1, wherein during the entire severing of the closure the contact line along the blade edge is shorter than the blade edge length.

* * * * *